United States Patent [19]

Ray

[11] 4,175,348
[45] Nov. 27, 1979

[54] ILLUMINATED FISHING LURE WITH MAGNETIC SWITCH

[76] Inventor: William E. Ray, P.O. Box 104, Korbel, Calif. 95550

[21] Appl. No.: 924,047

[22] Filed: Jul. 12, 1978

[51] Int. Cl.² ............................................. A01K 85/01
[52] U.S. Cl. ..................................... 43/17.6; 335/205
[58] Field of Search ................ 43/17.5, 17.6; 335/205; 357/17; 362/108, 800

[56] References Cited

U.S. PATENT DOCUMENTS

| | | | |
|---|---|---|---|
| 2,955,375 | 10/1960 | Mitchell | 43/17.6 |
| 3,308,569 | 3/1967 | Foellner | 43/17.6 |
| 3,535,812 | 10/1970 | Crecelius | 43/17.6 |
| 3,601,729 | 8/1971 | Hierta | 335/205 |
| 3,721,033 | 3/1973 | Haynes | 43/17.6 |
| 3,737,647 | 6/1973 | Gomi | 357/17 X |
| 3,792,389 | 2/1974 | Murphy | 335/205 |
| 3,940,868 | 3/1976 | Northcutt | 43/17.6 |
| 4,085,538 | 4/1978 | Jankowski | 43/17.6 |
| 4,114,305 | 9/1978 | Wohlert | 43/17.6 |

FOREIGN PATENT DOCUMENTS 587453  11/1959  Canada ..................................... 43/17.6

*Primary Examiner*—Nicholas P. Godici
*Attorney, Agent, or Firm*—Melvin R. Stidham

[57] ABSTRACT

A fishing lure comprising a hollow body in which is encapsulated a solid state electric circuit, including light emitting diodes (LED's). Two LED's are seen through translucent eyes and a plurality of LED's are arrayed along each side of the body. An LED flasher/oscillator and a capacitor causes the LED's to flash on and off intermittently. A magnetic reed switch contained within the body is disposed alongside a non-magnetic tube containing a permanent magnet therein. By jarring the body, the magnet is moved from one end of the tube to the other, and at one end it causes the magnetic reed switch to close and energize the circuit and activate the lure.

4 Claims, 2 Drawing Figures

U.S. Patent  Nov. 27, 1979  4,175,348

ILLUMINATED FISHING LURE WITH MAGNETIC SWITCH

BACKGROUND OF THE INVENTION

It is commonly known that fishing lures are much more effective if they can project or reflect light rays. Hence, fishing lures are often made of shiny materials or are brightly painted to make them highly visible. Others have provided small light bulbs, or more recently, light emitting diodes (LED's) to transmit a light, hopefully to attract the fish. However, such light sources often have more demanding energy requirements than can be delivered effectively over substantial distances along the length of the fishing line and, even if self-contained, the requirement for a lead-in from an external, manually operated switch makes it extremely difficult to keep the electrical components totally isolated from the seawater environment in which the lure is used.

OBJECTS OF THE INVENTION

It is an object of this invention to provide a fishing lure including a source of light with low energy requirements and in which the electrical circuitry can be wholly sealed within the body of the lure.

It is a further object of this invention to provide a fishing lure with low energy light sources which can be energized without the requirement of manually operated switches.

It is a further object of this invention to provide a fishing lure with low energy light sources which can be deactivated for energy conservation when not in use.

It is a further object of this invention to provide a fishing lure with low energy light sources requiring a minimum number of movable mechanical parts to operate.

It is a further object of this invention to provide a fishing lure with a low energy light source energized by batteries with means for recharging the batteries from the extension.

Other objects and advantages of this invention will become apparent from the description to follow, particularly when read in conjunction with the accompanying drawing.

SUMMARY OF THE INVENTION

In carrying out this invention, I provide a hollow body configurated to simulate a fish with two transparent or translucent windows to represent the eyes. A pair of light emitting diodes is positioned to be seen through the eyes and a plurality of LED's are arrayed along each side of the body. The LED's are contained in a circuit which includes the LED flasher/oscillator and a capacitor which cause the LED's to flash intermittently. Also included in the circuit is a magnetic reed switch which is positioned adjacent a nonmagnetic tube containing a permanent magnet. Magnetic members at both ends of the tube cause the magnet to cling to whichever end it is impelled. At one end it causes the magnetic reed switch to close and at the other end the switch is opened. Hence, by jarring the body of the fish the magnet may be dislodged from one end of the tube and driven to the other, so that the switch may be closed without requiring access to the interior or without lead-in means from an external switch. A phone jack is provided in the body of the lure to enable recharging the batteries from an external source.

DESCRIPTION OF A PREFERRED EMBODIMENT

Figure 1:
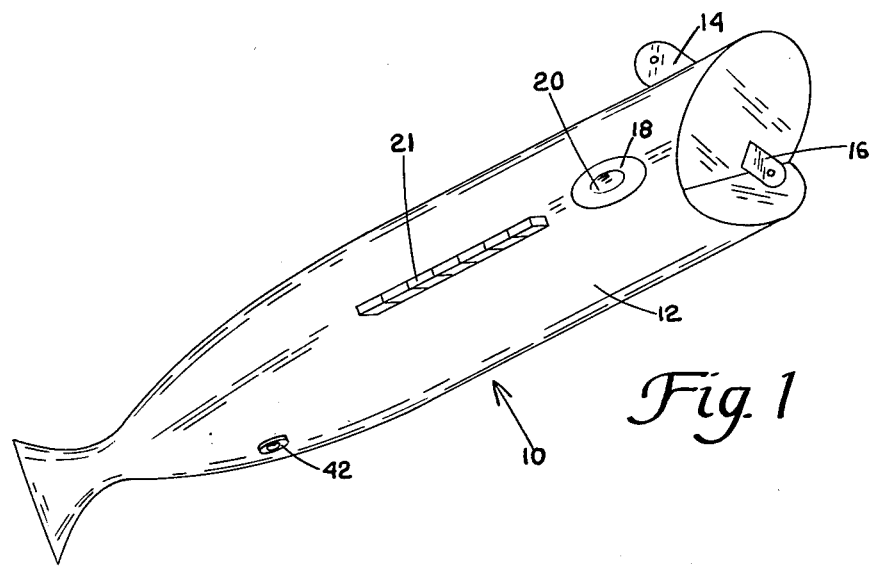
FIG. 1 is a view in perspective of the fishing lure of this invention.

Referring now to FIG. 1 with greater particularity, the fishing lure 10 of this invention includes a hollow body 12 configurated to give the general appearance of a fish, and includes means 14 and 16 for attachment of a hook and line, respectively (not shown). Eyes 18 in the sides of the fish are transparent or translucent, and visible through them are light emitting diodes 20. In addition, there are preferably a plurality of LED's 21 arrayed along each side of the body 12 as in the straight line shown. The body around the window 18 and the LED arrays 21 may be effectively sealed or encapsulated and circuitry for energizing the LED's may be wholly contained within the body 12.

Figure 2:
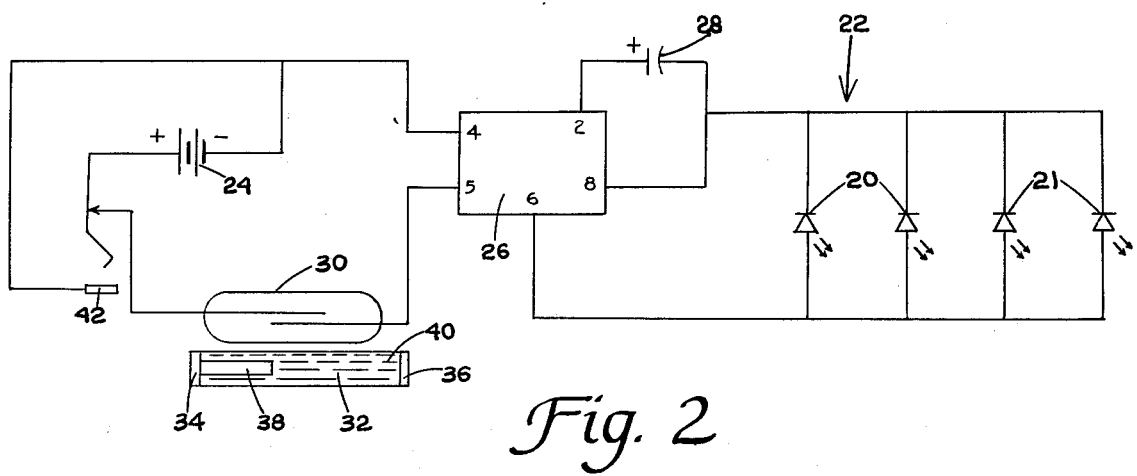
FIG. 2 is a wiring diagram of the circuitry which enables the light sources to flash on and off.

Referring now to FIG. 2 the circuit 22 includes a source of electricity 24, such as a pair of small batteries and an LED flasher/oscillator, such as model RS 3909 offered for sale by Archer Company, together with a timing capacitor 28 which delivers pulses to the LED's 20 and 21 at timed intervals.

Also disposed in the body 12 is a magnetic reed switch 30 positioned adjacent a non-magnetic tube 32 having magnetic members 34,36 such as iron discs at opposite ends thereof. Movably contained within the tube 32 is a permanent magnet 38, preferably movable through a liquid 40 of a viscosity selected to impede movement of the magnet 38 as desired. In operation, when the magnet 38 is at one end of the tube 32, as for example, clinging to iron disc 34, the magnetic reed switch is repelled to open, as shown in FIG. 2. Then, simply by jarring the body 12, as by striking against the palm of the hand, the magnet may be jarred loose from the iron disc 34 and moved across to the disc 36, in which position it attracts the magnetic reed switch 30 and moves it to closed position. Hence, there is no need for a switch on the outside of the body and simply by jarring the fish, the lure is prepared for use. Similarly, when the fishing is interrupted, the body 12 may be jarred again to force the magnet 38 back against the iron disc 34 wherein the circuit is de-energized. Also provided in the body 12 of the lure 10 is a phone jack 42 which enables the batteries 24 to be recharged from an external source.

While this invention has been described in conjunction with a preferred embodiment thereof, it is obvious that modifications and changes therein may be made by those skilled in the art without departing from the spirit and scope of this invention, as defined by the claims appended hereto.

What is claimed as invention is:

1. A fishing lure comprising:
   a hollow body configurated to simulate a fish;
   translucent eyes on opposite sides of said body;
   a pair of light emitting diodes positioned in said body to be seen through said eyes;
   a source of electricity in said body;
   an electric circuit connecting said source to said light emitting diodes; and a switch in said circuit in condition to be opened and closed by contacting said body, said switch comprising:

a magnetic reed switch;

a non-magnetic tube mounted adjacent said magnetic reed switch;

magnetic members carried at each end of said tube; and a permanent magnet in said tube;

said tube and switch being so positioned relative to each other that when said magnet is at one end of the tube the switch is closed thereby, and when said magnet is at the other end of said tube the switch is open.

2. The fishing lure defined by claim 1 including:
a liquid in said tube to restrict movements of said magnet.

3. The fishing lure defined by claim 1 including:
an LED flasher/oscillator and a capacitor in said circuit.

4. The fishing lure defined by claim 1 including:
a plurality of light emitting diodes arrayed along both sides of said body and connected into said circuit.

* * * * *